Figure 1:
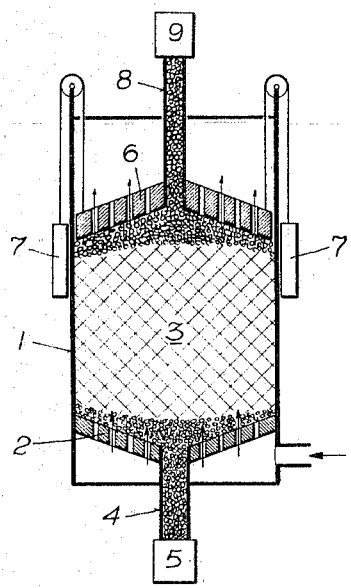

Jan. 10, 1967 H. GRÜMM ET AL 3,297,538
NUCLEAR REACTORS
Filed July 30, 1963 2 Sheets-Sheet 1

INVENTORS
Dr. Hans GRÜMM
Dipl.-Ing Hermann JAUK
Dipl.-Ing Norbert SCHWARZ

McGlew and Toren
ATTORNEYS 3,297,538
NUCLEAR REACTORS
Hans Grümm, Hermann Jauk, and Norbert Schwarz, Vienna, Austria, assignors to Osterreichische Studiengesellschaft fur Atomenergie Ges.m.b.H., Vienna, Austria
Filed July 30, 1963, Ser. No. 298,667
Claims priority, application Austria, Aug. 4, 1962, A 6,309/62
14 Claims. (Cl. 176—27)

This invention relates in general to nuclear treating devices and in particular to a new and useful reactor having means for insuring that the radioactive particles are not withdrawn when gases are circulated therethrough.

Nuclear reactors filled with small, for instance spherical particles containing fission material, fertile materials and moderator materials in different combinations, have various advantages. One of the most essential advantage lies in the fact that the volume of the core may be varied within certain limits for compensating changes of reactivity of various reasons. In such case no absorption rods are necessary for controlling the reaction. Thus the installation of an excess reactivity is omitted for compensation of the scaling loss.

In known reactors the particles are inserted from above into a substantially cylindrical vessel, and are removed from below. The filling operation is similar to the pouring of a liquid and the particles conform at the sides and below to the form of the reactor vessel whereas on top a cone like free surface is formed being defined by the kind of the filling and the properties of the filling material.

As an example the ball heap high temperature reactor is mentioned. A variant of this reactor group uses as a filling material balls made of graphite having a fission material. The ceramic material of the particles together with an inert cooling gas allows high temperatures in the reactor and thus makes possible a high thermic efficiency.

For various reasons—especially that one is not forced to attach the supporting construction to the hot end—the cooling gas is usually blown from below through the filling. However, the minimum size of the particles is determined by this process which must be heavy enough so that they cannot be lifted by the stream of the cooling gas. Therein lies an undesired restriction for the choice of the sizes of the particles. If one changes to smaller particles this would allow a restriction of the heat transferred per unit surface and an increase of the power output, as well as an optimum provision of the size of the particles with respect to resonance absorption, and would decrease the central temperature in the particles, too. The use of particles of different sizes would mean an improvement of the degree of admission in the filling.

It is an object of the present invention to give the abovementioned improvements with respect to the size of the particles, whereby the explained restrictions of the particles size are removed.

The possibility therefore has already become known and lies in changing to radial gas admission. Thereby the gas admission or discharge has to be placed in the center of the fission zone. This gives deterioration of the neutron economy. The present invention may maintain the gas flow from below to the top since it is advantageous for various reasons. The invention provides means for avoiding the lifting of the particles of the filling. The basic idea is that the filling is defined by walls of the vessel at all sides and includes means for holding the filling always under pressure even on its top surface. At the same time it is ensured that the passage of balls is undisturbed.

This idea might be ensured according to the invention in the most simple form as it is shown in the embodiment of FIG. 1. The reactor vessel 1 has a fixed bottom 2 having small apertures through which the cooling gas can pass to the top. However, means are provided to prevent the balls of the reactor filling 3 leaving the vessel below. The discharge tube 4 with the discharge mechanism 5 is arranged in the center of the bottom 2. Up to this fact FIG. 1 corresponds to the known arrangements. The ball heap 3 is, according to the invention, burdened by a movable cover 6 which might be plane, too, but which is formed advantageously with an inclination being larger than the free slope cone of the filling. The weight of the movable cover 6 is such that the lifting of the balls from the heap 3 is prevented in all thinkable working conditions. Normally the cover also provides a neutron reflector and its weight might be partly accommodated by counterweight 7. The movable cover is provided with sufficiently small apertures for the outlet of the hot gases and is additionally provided with a feed pipe 8 for the admission of new balls from the feed mechanism 9. It is self evident that several feed pipes might be provided.

Figure 2:
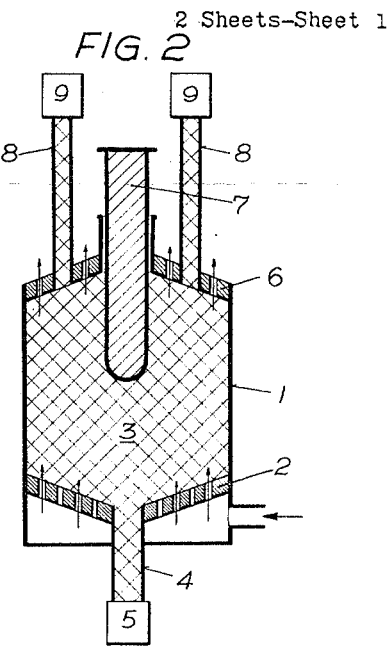

FIG. 2 shows a second embodiment. Here the reference numbers 1 to 5 are applied in a similar manner to similar parts. The upper cover 6 is installed rigidly like the lower one. The loading of the ball heap is provided by displacing means 7 which might also be provided by several constructions. The upper cover is once again provided with feeding pipes 8 to which the feeding mechanism 9 is attached. The displacing means 7 is advantageously filled with reflector material and its weight is, if necessary, accommodated to a desired part by counterweights or other means known per se.

Figure 3:
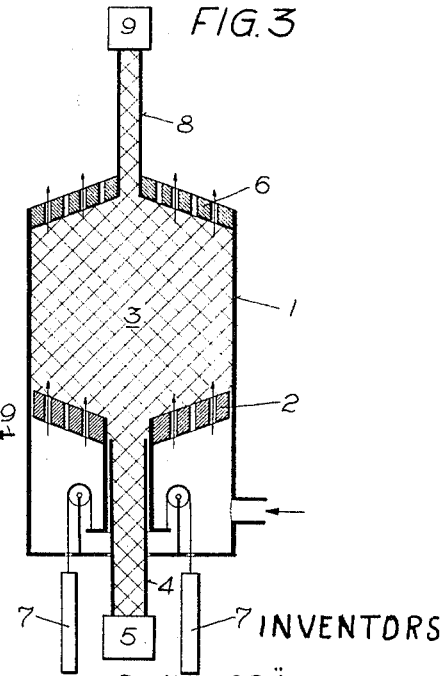

In the embodiment shown in FIG. 3 a fixed upper cover 6 and a movable lower cover 2 being held by counterweight 7 are used.

An important indication refers to the feed pipe 8 in all the embodiments. Here two variants are possible. If the pipes are relatively short the weight of the column of the particles in the tube cannot counterbalance the lifting forces in the filling. The feed mechanism 9 must then deliver new particles under pressure. However, the feed tubes are advantageously of a length such that the column of particles being within the tube counterbalances the lifting forces in the filling. Thus a free surface of the filling material is formed in the feed pipe, which permits simplification of the construction of the feed mechanism 9. There is no danger that the particles will be lifted as the feed pipes are not passed by the cooling gas.

The feed pipes having the free surface of the filling material permit construction of the discharge mechanism in a very simple way according to the priciple of the communicating pipes and thus a maximal approximation to the known advantages of a homogenous reactor.

Figure 4:
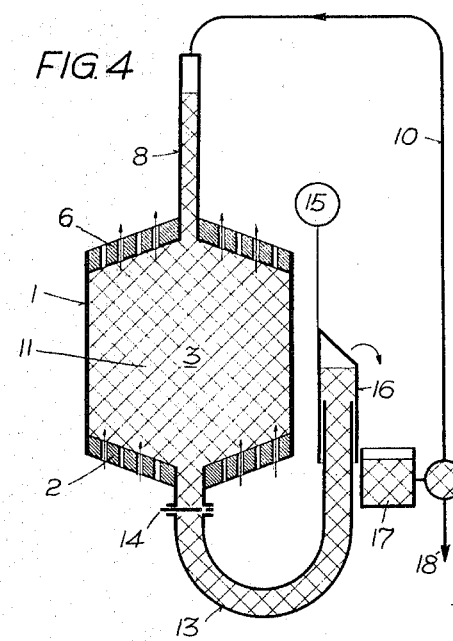

In the embodiment of FIG. 4 above, the fission zone 11 there is a column of particles in the feed pipe 8, providing the necessary hold down force. The discharge is effective by the siphon 13 with shut off valves 14. At the discharge end a sleeve 16 is arranged being movable by a motor 15. With this sleeve the over flow might be controlled. The over flowing particles come into a storage vessel 17 and run pneumatically through a testing plant either into the waste 18 or together with newly added particles 19 by way of an uptake 10 back to the feed pipe.

For avoiding a sticking fast of the particles the discharge has a diameter, larger than several diameters of the particles and might be provided with a vibrator, too.

Figure 5:
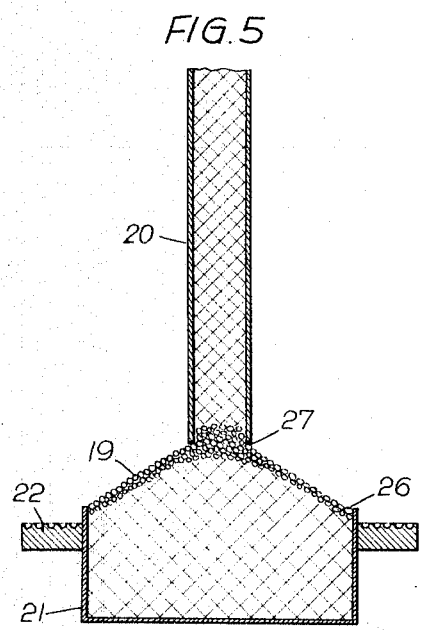

According to FIG. 5 of the drawings a discharge tube 20 is connected to vessel 21 the upper edge 26 of which is provided in a predetermined distance from the lower edge 27 of the discharge tube 20. This distance is given by the cone of repose of the particles 19. By lowering the vessel 21, i.e. by enlarging the distance at which the admissable angle of slope of the cone is surpassed, the particles 19 begin to run out of the discharge tube 20. The particles can come into grooves having a diameter or about one ball and are attached to the outer surface of the vessel; thus the balls are arranged one behind the other. From here they can be moved forward one by one, e.g. by a tube system being actuated by compressed air. The grooves 22 might be circular or helical or even be inclined in form of a screw line.

Figure 6:
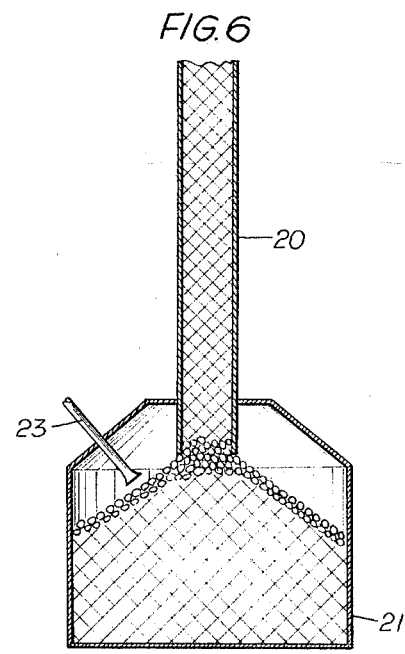

A further possibility is shown in FIG. 6 where the particles are removed by suction from the vessel 21. This might be effected by a movable cone-like suction opening 23. Thereby the particles are guided to the above-mentioned tube system.

Figure 7:
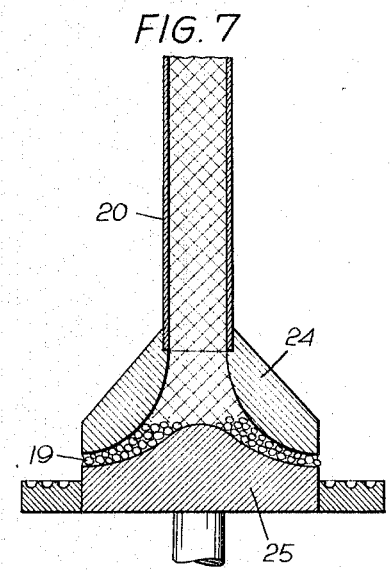
Figure 8:
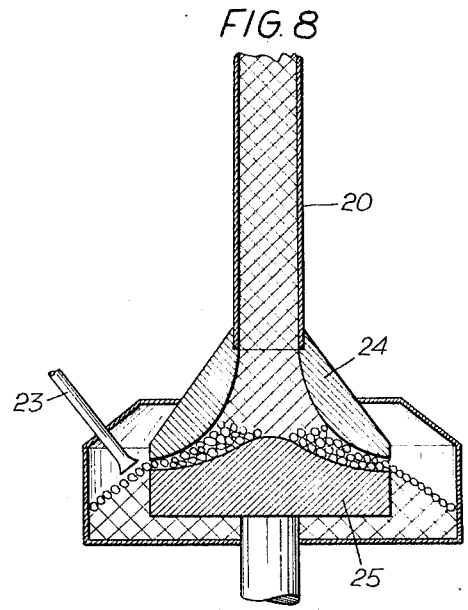

Other possibilities are shown in FIGS. 7 and 8. At the lower end of the discharge tube 20 there is an extension 24 of predetermined shape. A counterpart 25 engages in extension 24. The passage of the particles 19 might be controlled by lifting and lowering of the counterpart 25. For an improvement of the passage the counterpart 25 could be rotatable. The transfer of the particles might be effected as mentioned above by grooves or by suction from a collecting vessel into a compressed air system.

We claim:

1. A nuclear reactor comprising wall means defining a reactor chamber fission zone having heated particles including nuclear fuel therein, said wall means including a gas inlet end wall with at least one opening for the inflow of gas therethrough and an outlet end wall with a cover in contact with the particles having an opening for the discharge of gas therethrough, means for circulating a cooling gas through the opening of said gas inlet end wall and through the particles and for discharging the gas through the opening of the opposite outlet end wall, said wall means including means holding down the surface of said particles at the location of cooling gas discharge flow with a steady holding down force to prevent the lifting of the particles by the working gas flow.

2. A nuclear reactor comprising wall means defining a reactor chamber fission zone having heated particles including nuclear fuel therein, means for circulating a cooling gas upwardly through the bottom of said wall means and the particles and for discharging the gas at an opposite end of said wall means, said wall means including means holding down the surface of said particles at the location of cooling gas discharge flow with a steady holding down force to prevent the lifting of the particles by the working gas flow including a cover resting on the surface of said particles and being of a weight to urge said particles downwardly in a direction opposite the cooling gas flow.

3. A nuclear reactor comprising wall means defining a reactor chamber fission zone having heated particles including nuclear fuel therein, means for circulating a cooling gas upwardly through the bottom of said wall means and the particles and for discharging the gas at an opposite end of said wall means, said wall means including means holding down the surface of said particles at the location of cooling gas discharge flow with a steady holding down force to prevent the lifting of the particles by the working gas flow including a cover resting on the surface of said particles and being of a weight to urge said particles downwardly in a direction opposite the cooling gas flow, a feeding tube extending outwardly from said cover and feeding means in said tube for advancing particles through said feeding tube and through said cover into said fission zone.

4. A nuclear reactor comprising wall means defining a reactor chamber fission zone having heated particles including nuclear fuel therein, means for circulating a cooling gas upwardly through the bottom of said wall means and the particles and for discharging the gas at an opposite end of said wall mean, said wall means including means holding down the surface of said particles at the location of cooling gas discharge flow with a steady holding down force to prevent the lifting of the particles by the working gas flow including a cover resting on the surface of said particles and being of a weight to urge said particles downwardly in a direction opposite the cooling gas flow, a feeding tube extending outwardly from said cover, feeding means in said tube for advancing particles through said feeding tube and through said cover into said fission zone, and counter-balancing weight means connected to said cover for relieving a portion of the weight of said cover acting on said particles.

5. A nuclear reactor comprising wall means defining a reactor chamber fission zone having heated particles including nuclear fuel therein, means for circulating a cooling gas upwardly through the bottom of said wall means and the particles and for discharging the gas at an opposite end of said wall means, said wall means including means holding down the surface of said particles at the location of cooling gas discharge flow with a steady holding down force to prevent the lifting of the particles by the working gas flow including a cover resting on the surface of said particles and being of a weight to urge said particles downwardly in a direction opposite to the cooling gas flow, a feeding tube extending outwardly from said cover and feeding means for advancing particles through said feeding tube and through said cover into said fission zone, said wall means including a fixed bottom wall, a discharge tube extending downwardly from said bottom wall, discharge means connected to said discharge tube for discharging particles from said fission zone, said wall means further including a double wall, surrounding said bottom wall for the inflow of cooling gas, said bottom wall having perforations therein for cooling gas flow upwardly through said bottom wall through the particles, said wall means further including a top wall having perforations therein for the outflow of cooling gas.

6. A nuclear reactor comprising wall means defining a reactor chamber fission zone having heated particles including nuclear fuel therein, means for circulating a cooling gas upwardly through the bottom of said wall means and the particles and for discharging the gas at an opposite end of said wall means, said wall means including means holding down the surface of said particles at the location of cooling gas discharge flow with a steady holding down force to prevent the lifting of the particles by the cooling gas flow including a fixed cover and displacing means slidably carried in said cover and contacting said particles to urge said particles downwardly in a direction opposite the cooling air flow.

7. A nuclear reactor comprising wall means defining a reactor chamber fission zone having heated particles including nuclear fuel therein, means for circulating a cooling gas upwardly through the bottom of said wall means and the particles and for discharging the gas at an opposite end of said wall means, said wall means including means holding down the surface of said particles at the location of cooling gas discharge flow with a steady holding down force to prevent the lifting of the particles by the working gas flow including a fixed cover and displacing means slidably carried in said cover and contacting said particles to urge said particles downwardly in a direction opposite the cooling air flow, a plurality of feed pipes connected into said fixed cover, and means for feeding particles through said feed pipes to said fission zone.

8. A nuclear reactor comprising wall means defining a reactor chamber fission zone having heated particles including nuclear fuel therein, means for circulating a cooling gas upwardly through the bottom of said wall means and through the particles and for discharging the gas at an opposite end of said wall means, said wall means including means holding down the surface of said particles at the location of cooling gas discharge flow with a steady holding down force to prevent the lifting of the particles by the cooling gas flow including fixed top and bottom covers, an infeed pipe connected through said top cover for feeding particles inwardly to said fission zone, whereby the height of said particles in said infeed tube may be controlled to bias said particles downwardly against upward movement due to the cooling air flow.

9. A nuclear reactor comprising wall means defining a reactor chamber fission zone having heated particles including nuclear fuel therein, means for circulating a cooling gas upwardly through the bottom of said wall means and the particles and for discharging the gas at an opposite end of said wall means, said wall means including means holding down the surface of said particles at the location of cooling gas discharge flow with a steady holding down force to prevent the lifting of the particles by the working gas flow including fixed top and bottom covers, an infeed pipe connected through said top cover for feeding particles inwardly to said fission zone, whereby the height of said particles in said infeed tube may be controlled to bias said particles downwardly against upward movement due to the cooling air flow, a fixed discharge wall, a discharge tube connected to said wall for the discharge of particles thereout, valve means in said discharge tube, and means connected to said discharge tube for controlling the overflow of said discharge tube of the particles being delivered therethrough.

10. A nuclear reactor comprising wall means defining a reactor chamber fission zone having heated particles including nuclear fuel therein, means for circulating a cooling gas upwardly through the bottom of said wall means and the particles and for discharging the gas at an opposite end of said wall means, said wall means including means holding down the surface of said particles at the location of cooling gas discharge flow with a steady holding down force to prevent the lifting of the particles by the working gas flow including a movable bottom wall and an infeed pipe connected to the top of said reactor.

11. A nuclear reactor comprising wall means defining a reactor chamber fission zone having heated particles including nuclear fuel therein, means for circulating a cooling gas upwardly through the bottom of said wall means and the particles and for discharging the gas at an opposite end of said wall means, said wall means including means holding down the surface of said particles at the location of cooling gas discharge flow with a steady holding down force to prevent the lifting of the particles by the working gas flow including a discharge conduit connected to the bottom of said reactor, a collecting trough located below said discharge conduit in a position to receive particles in a heap thereon, said trough being located so that the discharge conduit covers the apex of the heap of particles delivered out of said discharge conduit.

12. A nuclear reactor comprising wall means defining a reactor chamber fission zone having heated particles including nuclear fuel therein, means for circulating a cooling gas upwardly through the bottom of said wall means and the particles and for discharging the gas at an opposite end of said wall means, said wall means including means holding down the surface of said particles at the location of cooling discharge flow with a steady holding down force to prevent the lifting of the particles by the working gas flow including a discharge conduit connected to the bottom of said reactor, a collecting trough located below said discharge conduit in a position to receive particles in a heap thereon, said trough being located so that the discharge conduit covers the apex of the particles delivered out of said discharge conduit, said collecting trough comprising a member which is displaceable in respect to said discharge conduit.

13. A nuclear reactor comprising wall means defining a reactor chamber fission zone having heated particles including nuclear fuel therein, means for circulating a cooling gas upwardly through the bottom of said wall means and the particles and for discharging the gas at an opposite end of said wall means, said wall means including means holding down the surface of said particles at the location of cooling gas discharge flow with a steady holding down force to prevent the lifting of the particles by the working gas flow including a discharge conduit connected to the bottom of said reactor, a collecting trough located below said discharge conduit in a position to receive particles in a heap thereon, said trough being located so that the discharge conduit covers the apex of the heap of particles delivered out of said discharge conduit, means defining grooves for the collecting of the particles overflowing from said receiving container.

14. A nuclear reactor wall means defining a reactor chamber fission zone having heated particles including nuclear fuel therein, means for circulating a cooling upwardly through the bottom of said wall means and the particles and for discharging the gas at an opposite end of said wall means, said wall means including means holding down the surface of said particles at the location of cooling gas discharge flow with a steady holding down force to prevent the lifting of the particles by the working gas flow including a discharge conduit connected to the bottom of said reactor, a collecting trough located below said discharge conduit in a position to receive particles in a heap thereon, said trough being located so that the discharge conduit covers the apex of the heap of particles delivered out of said discharge conduit, and vacuum means for withdrawing particles from said receiving container.

References Cited by the Examiner

UNITED STATES PATENTS

| | | |
|---|---|---|
| 725,149 | 4/1903 | Saenger. |
| 813,059 | 2/1906 | Proed. |
| 1,176,239 | 3/1916 | Page _____ 200—93 X |
| 2,280,768 | 4/1942 | Grover. |
| 2,975,116 | 3/1961 | Daniels _____ 176—45 X |
| 3,039,945 | 6/1962 | Slack et al. _____ 176—45 X |
| 3,124,514 | 3/1964 | Koutz et al. _____ 176—40 X |
| 3,130,130 | 4/1964 | Haines et al. _____ 176—87 |

FOREIGN PATENTS

| | | |
|---|---|---|
| 1,289,985 | 2/1962 | France. |

REUBEN EPSTEIN, *Primary Examiner.*